United States Patent
Kato

(10) Patent No.: US 9,068,115 B2
(45) Date of Patent: Jun. 30, 2015

(54) VACUUM FLUORESCENT DISPLAY APPARATUS HAVING BARIUM ABSORBENT

(75) Inventor: Koji Kato, Mie (JP)

(73) Assignees: NORITAKE ITRON CORPORATION, Mie (JP); NORITAKE CO., LIMITED, Aichi (JP)

( * ) Notice: Subject to any disclaimer, the term of this patent is extended or adjusted under 35 U.S.C. 154(b) by 311 days.

(21) Appl. No.: 13/373,112

(22) Filed: Nov. 4, 2011

(65) Prior Publication Data

US 2012/0112625 A1    May 10, 2012

(30) Foreign Application Priority Data

Nov. 8, 2010    (JP) .................... 2010-249401

(51) Int. Cl.
| | | |
|---|---|---|
| H01J 1/62 | (2006.01) |
| H01J 63/04 | (2006.01) |
| C09K 11/77 | (2006.01) |
| H01J 31/15 | (2006.01) |

(52) U.S. Cl.
CPC ............. *C09K 11/7703* (2013.01); *H01J 31/15* (2013.01); *H01J 2329/20* (2013.01); *H01J 2329/943* (2013.01); *C09K 11/7789* (2013.01)

(58) Field of Classification Search
CPC ........ H01J 2329/943–2329/948; H01J 31/126; H01J 31/15; H01J 2329/20
USPC .................. 313/495–497, 558; 252/181.6
See application file for complete search history.

(56) References Cited

U.S. PATENT DOCUMENTS

| | | | | |
|---|---|---|---|---|
| 4,401,982 A | * | 8/1983 | Miyazaki et al. ............... 345/47 |
| 2001/0013755 A1 | * | 8/2001 | Ogawa et al. ................. 313/496 |
| 2004/0227451 A1 | * | 11/2004 | Tsuji et al. .................... 313/484 |
| 2005/0269938 A1 | * | 12/2005 | Toki et al. ..................... 313/496 |
| 2006/0028121 A1 | * | 2/2006 | Satoh et al. ................... 313/496 |
| 2006/0066216 A1 | * | 3/2006 | Koga et al. ................... 313/496 |
| 2006/0087248 A1 | * | 4/2006 | Konishi et al. ............. 315/169.3 |

FOREIGN PATENT DOCUMENTS

| | | |
|---|---|---|
| JP | 63-221545 A | 9/1988 |
| JP | 07-220665 A | 8/1995 |
| JP | 08-283709 A | 10/1996 |
| JP | 2000-340140 A | 12/2000 |
| JP | 2000-353483 A | 12/2000 |
| JP | 2002-093345 A | 3/2002 |
| JP | 2005-209594 A | 8/2005 |
| JP | 2006-213891 A | 8/2006 |
| JP | 2010-181517 A | 8/2010 |

OTHER PUBLICATIONS

Translation of Hattori et al. JP 63-221545 A, translated Jun. 2014.*

* cited by examiner

*Primary Examiner* — Nimeshkumar Patel
*Assistant Examiner* — Steven Horikoshi
(74) *Attorney, Agent, or Firm* — Hedman & Costigan, P.C.; James V. Costigan; Kathleen A. Costigan

(57) ABSTRACT

A vacuum fluorescent display apparatus comprising a filament cathode (10) and an anode (7); the filament cathode being arranged in a vacuum container, and used for releasing low-energy electrons; the anode having a phosphor (8) adhering thereto, and being struck by the low-energy electrons and thereby caused to emit light; wherein a structural body (9) is provided to a region in which the low-energy electrons released by the cathode can be controlled; the structural body having an electrically conductive or semi-conductive metal oxide formed at a portion that is bombarded by low-energy electrons.

10 Claims, 13 Drawing Sheets

(a)  (b)  (c)

VACUUM FLUORESCENT DISPLAY APPARATUS HAVING BARIUM ABSORBENT

BACKGROUND OF THE INVENTION

1. Field of the Invention

The present invention relates to a vacuum fluorescent display apparatus, comprising a phosphor for a low-energy electron beam as a light source.

2. Description of the Related Art

Phosphors that are excited by low-energy electron beams and that are used in vacuum fluorescent display apparatuses include phosphors in which an oxygen atom is included in the chemical formula of the parent material. Examples of phosphors of such description include ZnO, $Ca_{(1-x)}Sr_xTiO_3$:Pr,M (where $0 \leq x \leq 1$ and M is at least one type of metal selected from Al, Ga, In, Mg, Zn, Li, Na, and K), or $Ln_2O_2S$:Re (where Ln is at least one type of metal selected from La, Gd, Y, and Lu; and Re is Eu, Tb, or Sm). Phosphors of such description are prone to degradation in brightness caused by barium generated by evaporation from a filament cathode.

In particular, oxide-based red phosphors that do not contain Cd suffer from significant degradation in brightness in a voltage region of 30V or above. Therefore, a decrease in display quality due to degradation of a red phosphor occurs not only in instances in which only red phosphor is used, but also in instances in which a red phosphor is combined with a phosphor corresponding to another color and a mixture of colors is used. Accordingly, there is a significant decrease in the lifespan of a vacuum fluorescent display apparatus in which a red phosphor of such description are used.

Conventionally, the following methods have been proposed as methods for improving the lifespan characteristics of oxide-based red phosphors.

(1) A protective layer made from an oxide of Al, Ti, Si, Ga, Zn, Sn, Bi, or another element is formed on a phosphor comprising a parent material made from an alkaline earth metal and an oxide, e.g., a $SrTiO_3$:Pr,Al phosphor, in order to prevent a degradation in brightness of the phosphor (JP-A 8-283709).

(2) $TiO_2$ or $ZnO_2$ is used in a supplementary manner as a non-evaporating getter material. This getter material removes residual gas in a vacuum container in an effective manner, thereby improving the lifespan characteristics of the vacuum fluorescent display apparatus (JP-A 2000-340140).

(3) A gas storage material containing $ZrO_x$ (where $1 \leq x \leq 2$) is installed in a vacuum container. This gas storage material forms and maintains a vacuum in the vacuum container (JP-A 2005-209594).

According to method (1) above, the phosphor surface is protected from carbon, barium, or similar substances, thereby improving the lifespan characteristics. However, the lifespan of a vacuum fluorescent display apparatus made using an oxide-type red phosphor treated as described above remained extremely low compared to that of ZnCdS-based phosphors. Also, in order to extend the lifespan of the vacuum fluorescent display apparatus, it is necessary to increase the amount of protective film adhering to the phosphor. However, increasing the amount of protecting film adhered onto the surface of an oxide-based red phosphor results in a decrease in brightness.

Also, according to methods (2) and (3) described above, a getter material is installed in a vacuum container in order to enhance the level of vacuum in the vacuum container. The lifespan characteristics and light-emitting characteristics of the vacuum fluorescent display apparatus are improved by increasing the level of vacuum in the vacuum container using the getter material. Getter materials of such description is merely subjected to heat treatment and activated during manufacture. For example, $TiO_2$ is changed to TiO or Ti, thereby promoting adsorption of O and H in the vacuum container.

However, when the vacuum fluorescent display apparatus is being driven, the heat treatment is not applied, and the getter is not bombarded with an electron beam. Therefore, getters of such description are not activated. Accordingly, no adsorption of gas in the tube generated during driving takes place; in particular, no adsorption of barium, which is harmful to the phosphor, takes place. As a result, the lifespan of the vacuum fluorescent display apparatus cannot be enhanced.

SUMMARY OF THE INVENTION

An object of the present invention is to improve the lifespan characteristics of the phosphor, and in particular, to enhance the lifespan characteristics when a red phosphor that does not contain Cd is driven in a voltage range of 30V or above. As a result, the lifespan characteristics of a vacuum fluorescent display apparatus made using the phosphor are enhanced.

A vacuum fluorescent display apparatus according to the present invention is characterized in comprising a filament cathode and an anode; the filament cathode being arranged in a vacuum container, and used for releasing low-energy electrons; the anode having a phosphor adhered thereto, and being struck by the low-energy electrons and thereby caused to emit light; and in having: a structural body provided to a region in which the low-energy electrons released from the cathode can be controlled; the structural body having an electrically conductive or semi-conductive metal oxide formed at a portion that is bombarded by low-energy electrons.

The vacuum fluorescent display apparatus according to the present invention is characterized in that the structural body is a metal mesh-shaped grid, a rib-shaped grid erected around the phosphor, or a structural body provided between the filament cathode and the anode.

The vacuum fluorescent display apparatus is also characterized in that the electrically conductive or semi-conductive metal oxide formed on the surface of the structural body is an oxide of titanium.

The phosphor used in the vacuum fluorescent display apparatus according to the present invention is characterized in being a phosphor that includes at least an oxygen atom in a chemical formula of a parent material; and in being a phosphor having a titanate as a parent material, or an oxysulfide-based phosphor.

In particular, the phosphor having a titanate as a parent material is characterized in being a phosphor represented by $Ca_{(1-x)}Sr_xTiO_3$:Pr,M; where M is at least one element selected from Al, Ga, In, Mg, Zn, Li, Na, and K; and the x is within a range of $0 \leq x \leq 1$.

The oxysulfide-based phosphor is characterized in being a phosphor represented by $Ln_2O_2S$:Re; where Ln is at least one element selected from La, Gd, Y, and Lu; and Re is Eu, Tb, or Sm.

A structural body, having an electrically conductive or semi-conductive metal oxide formed at a portion that is bombarded by low-energy electrons, is provided to a region in which the low-energy electrons released by the cathode can be controlled, in a vacuum fluorescent display apparatus installed with a phosphor that includes at least an oxygen atom in the chemical formula of a parent body and that is excited by low-energy electrons.

Barium, which adversely affects the phosphor, is thereby trapped by the structural body. As a result, degradation of the phosphor is inhibited and the lifespan characteristics are improved. In particular, lifespan characteristics of a red phosphor at a voltage of 30V or above are significantly improved.

Also, according to the methods, described in (2) and (3) above, for improving the lifespan characteristics of an oxide-based red phosphor, a getter material is installed in a vacuum container in order to enhance the level of vacuum in the vacuum container. Therefore, according to this method, the getter material must be subjected to a separate activation treatment. In contrast, according to the present invention, the surface of the electrically conductive or semi-conductive metal oxide is bombarded with electron beams. Therefore, lifespan characteristics of the phosphor can be enhanced without performing a separate activation treatment.

DETAILED DESCRIPTION OF THE INVENTION

Oxide-based phosphors used as red phosphors for low-energy electron beams (e.g., $CaTiO_3$:Pr,Zn,Li; $SrTiO_3$:Pr,Al) have poor lifespan characteristics in a high-voltage region corresponding to a driving voltage of 30V or above.

One of the causes of the poor lifespan characteristics is as follows. Barium, which is released by evaporation from a filament cathode when the phosphor is driven, adheres to the phosphor surface. The barium adhering to the phosphor surface causes a reduction reaction with respect to the phosphor, and causes the phosphor to degrade.

If the barium can be inhibited from adhering to the phosphor, the lifespan characteristics of the phosphor can be expected to improve. For example, if the barium is trapped at another location before the barium adheres to the phosphor, the amount of barium reaching the phosphor is reduced. As a result, the lifespan characteristics of the phosphor are improved. It was found that activated electrically conductive or semi-conductive metal oxides trap barium. A description will now be given, using an oxide made from titanium (TiOx; hereafter abbreviated to "titanium oxide") as an example of an electrically conductive or semi-conductive metal oxide.

When titanium oxide is bombarded with an electron beam, electrons in the titanium oxide are excited, electrons and holes are generated, and the titanium oxide is activated. In particular, in titanium oxide, the time taken for the excited electrons and holes to recombine is longer, and the activated state therefore lasts longer, than in other oxides. The reactivity with respect to barium thereby increases, and the titanium oxide adsorbs barium.

As described above, in the present invention, it is important that titanium oxide is activated by being bombarded with an electron beam. Therefore, if titanium oxide is merely arranged as a getter in a region that is not bombarded with an electron beam as with conventional techniques, a reaction with barium does not readily occur, and the lifespan characteristics of the phosphor cannot be expected to significantly improve. The present invention is based on such knowledge.

Figure 1:
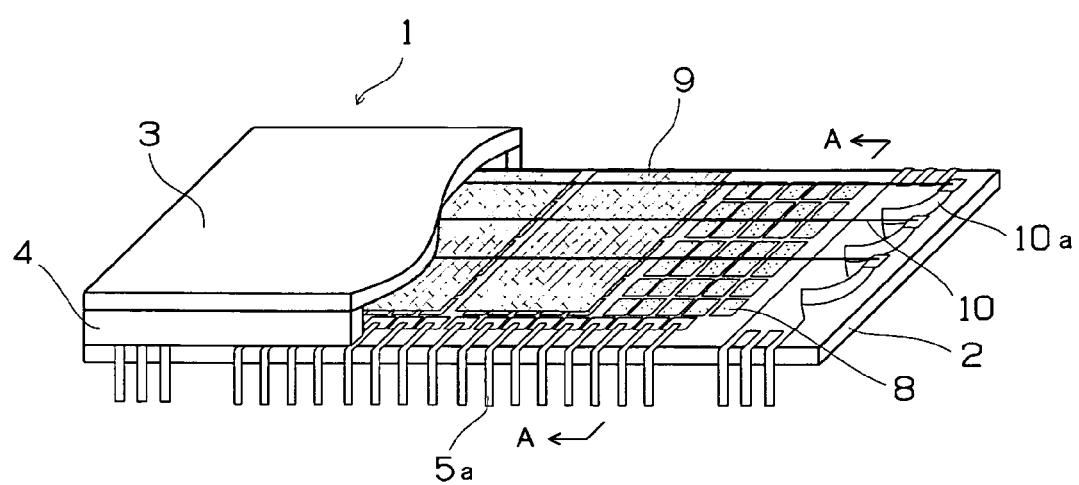
FIG. 1 is a perspective view of a vacuum fluorescent display apparatus having a metal mesh-shaped grid.
Figure 2:
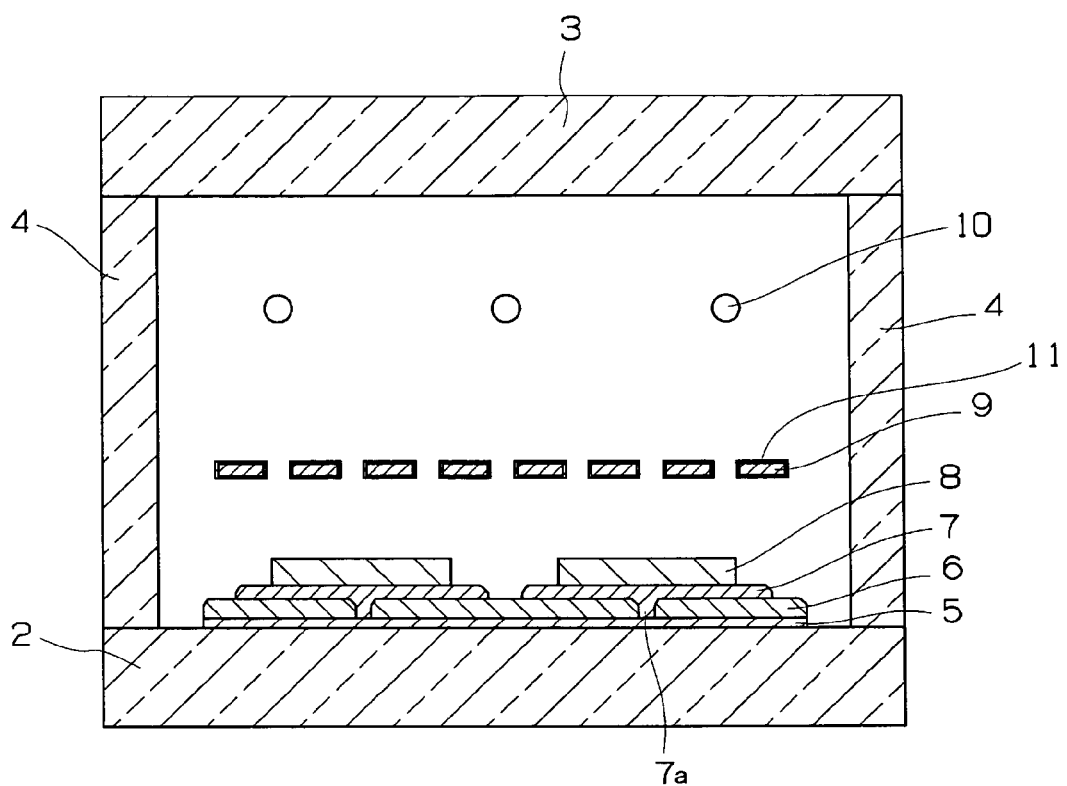
FIG. 2 is a cross-section view along line A-A in FIG. 1.
Figure 3:
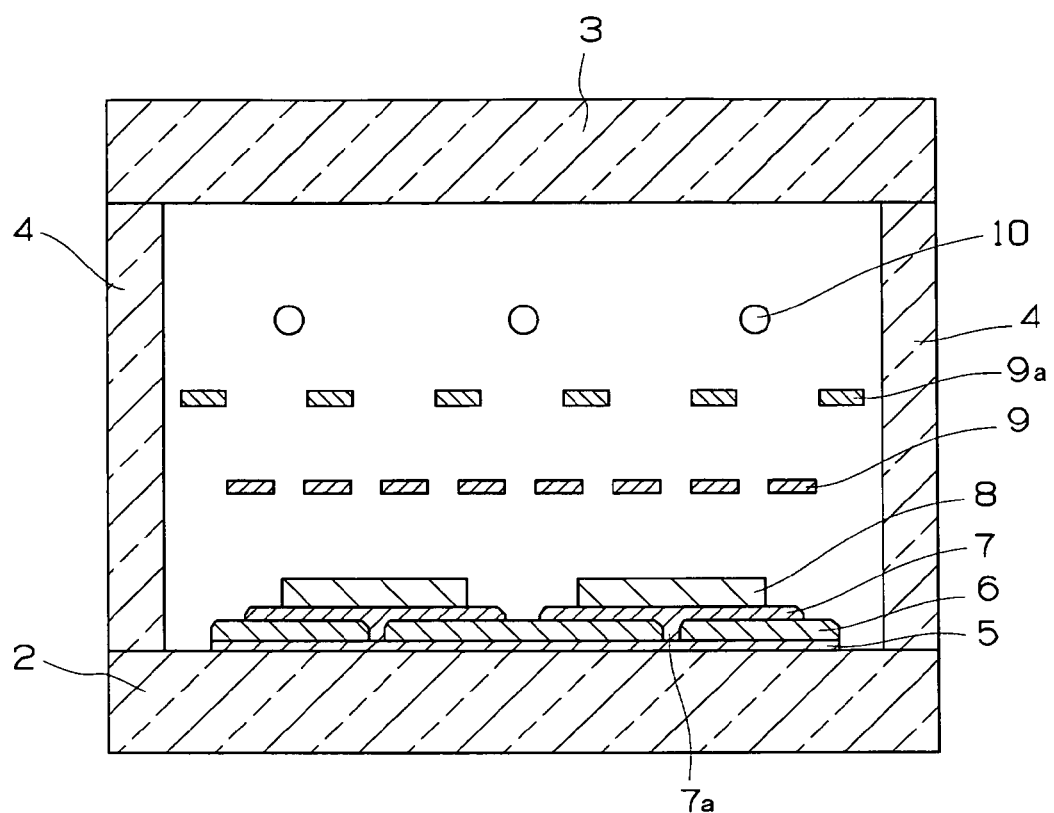
FIG. 3 is a drawing showing an example of an arrangement of a structural body.
Figure 4:
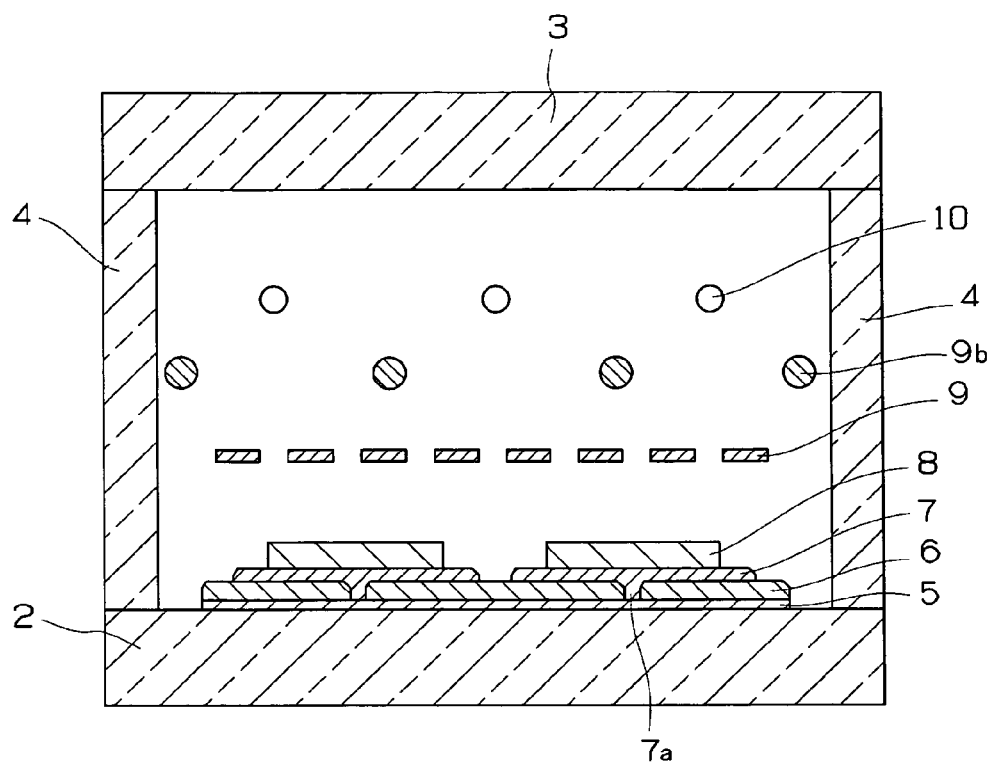
FIG. 4 is a drawing showing another example of an arrangement of the structural body.

A vacuum fluorescent display apparatus according to the present invention will now be described with reference to the accompanying drawings. FIG. 1 is a perspective view of the vacuum fluorescent display apparatus having a metal mesh-shaped grid. FIG. 2 is a cross-section view along line A-A in FIG. 1. FIGS. 3 and 4 are drawings showing examples of an arrangement of a structural body.

In the vacuum fluorescent display apparatus 1, four sides of a glass substrate 2 and of a face glass 3 are sealingly joined using a spacer member 4, and the vacuum fluorescent display apparatus 1 is configured as a long, flat, box-shaped, airtight vacuum container. The face glass 3 is formed from a translucent cover glass plate or a similar material; the glass substrate 2 is formed from glass, ceramic, porcelain enamel, or another insulator material; and the spacer member 4 is formed from a glass material or a similar material, formed into a frame shape.

As shown in FIGS. 1 and 2, on the glass substrate 2 in the vacuum container, a wiring layer 5 is formed, then an insulating layer 6 is formed over substantially the entire surface other than where through-holes 7a are present. An anode 7, which is electrically connected through the through-holes 7a, is formed. A phosphor or phosphor coated with a metal oxide layer 8 is caused to adhere to the anode 7.

A filament cathode 10 for releasing low-energy electrons is provided above the phosphor or phosphor coated with a metal oxide layer 8 in the vacuum container. A low-energy electron beam generated from the filament cathode 10 strikes the phosphor or phosphor coated with a metal oxide layer 8, and the phosphor emits light. In FIG. 1, 5a represents leads connecting from a wiring pad, and 10a represents filament anchors.

For the filament cathode 10, a superfine tungsten wire is coated with carbonates of alkaline earth metals (Ba, Sr, Ca)$CO_3$ together with a binder, and in the final stage of assembling the vacuum fluorescent display apparatus 1, electrically heated to approximately 1000° C. in a vacuum, whereby (Ba, Sr, Ca)O are formed. BaO, which has been partially reduced and activated on the superfine tungsten wire, is an electron-releasing source. SrO and CaO are blended in order to stabilize BaO. Therefore, scattering of barium readily occurs when the vacuum fluorescent display apparatus is driven.

In the vacuum fluorescent display apparatus 1 according to the present invention, a structural body 9 having an electrically conductive or semi-conductive metal oxide 11 formed on a surface is provided in a region in which it is possible to control low-energy electrons released from the filament cathode 10.

The structural body 9, configured from a metallic material, functions as a grid electrode and controls low-energy electrons.

A region in which it is possible to control low-energy electrons released from the filament cathode 10 is a region that is bombarded with the low-energy electrons, and is a region in which it is possible to control the direction and amount of bombardment of the low-energy electrons.

Examples of a region of such description include a region between the filament cathode 10 and the anode 7, or a surface of the anode 7.

A preferable region is a region in which the low-energy electrons can be controlled by a grid, where the structural body 9 functions as the grid, as shown in FIG. 2.

Barium scatters from the filament cathode 10. Therefore, the metal oxide for trapping the barium is formed between the filament cathode 10 and the phosphor or phosphor coated with a metal oxide layer 8, as with the grid 9.

This configuration is preferable, because the amount of barium reaching the surface of the phosphor can be minimized by the grid 9. Therefore, the metal oxide 11 is preferably caused to adhere to a surface of the grid 9 that is bombarded with the low-energy electron beam.

Other than the structural body 9 which functions as a grid, it is also possible to provide a structural body 9a (FIG. 3) or a structural body 9b (FIG. 4) between the structural body 9 and the filament cathode 10. Structural bodies of such description are preferably mesh-shaped or filament-shaped structural bodies, which do not significantly affect the display quality of the vacuum fluorescent display apparatus.

The structural body 9a is an example in which a mesh-shaped electrode is provided other than the structural body 9 which functions as a grid, and the structural body 9b is an example in which a filament-shaped electrode is provided.

By providing the structural body 9a, 9b, or a similar structural body, when the electrically conductive or semi-conductive metal oxide adhering to a surface is bombarded with an electron beam, the metal oxide is activated. The metal oxide being activated causes barium, which is harmful to the phosphor, to be adsorbed. As a result, the lifespan characteristics of the phosphor can be enhanced.

Increasing the line diameter of the newly formed structural body 9a, 9b, or a similar structural body, or installing the structural body so as to have a spiral or a zigzag shape, to an extent at which the display quality of the vacuum fluorescent display apparatus does not decrease, enhances the area over which barium is adsorbed, and is therefore preferable.

In an instance in which the structural body 9a or 9b is provided, the electrically conductive or semi-conductive metal oxide may or may not be formed on the surface of the grid 9.

Figure 5:
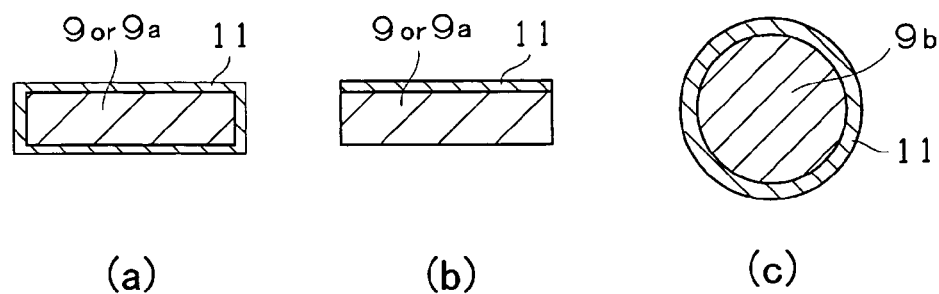
FIG. 5 is an expanded cross-section view of the structural body.

An expanded cross-section view of the structural body 9 is shown in FIG. 5. In FIG. 5, an upper part of the drawing is a side nearer the filament cathode 10.

The electrically conductive or semi-conductive metal oxide 11 is formed on at least the portion of the surface of the structural body 9, 9a, or 9b that is bombarded with low-energy electrons.

With regards to the portion on which the metal oxide 11 is formed, the metal oxide 11 may be formed so as to cover the surrounding of the structural body (FIGS. 5(a),(c)), or formed only on a side nearer the filament cathode 10 (FIG. 5(b)). Taking the area over which the metal oxide 11 adheres into account, it is preferable that the metal oxide 11 is adheringly formed so as to cover the entire surrounding of the structural body 9 exposed in vacuum. Adheringly forming the metal oxide 11 so as to cover the entire surrounding of the structural body 9 makes it possible to address instances in which electrons released from the filament cathode are reflected by surrounding wall surfaces or another surface.

Figure 6:
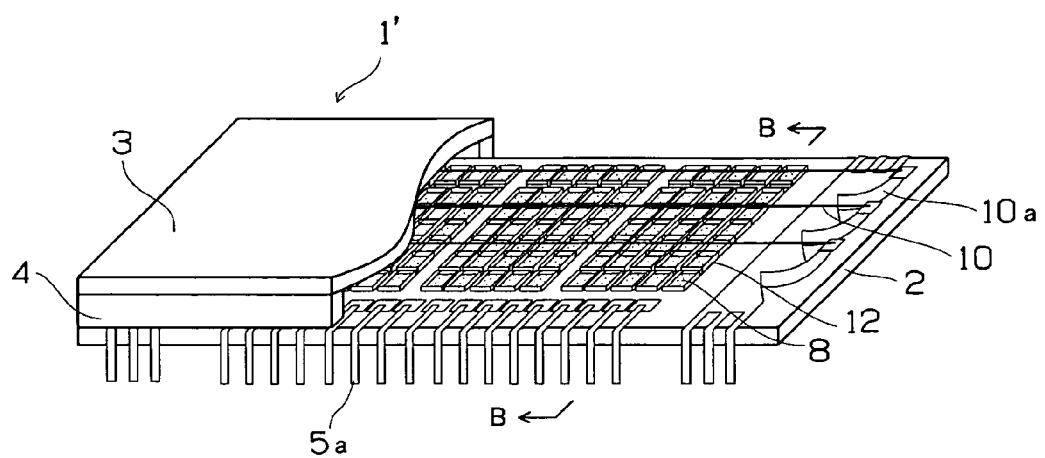
FIG. 6 is a perspective view of a vacuum fluorescent display apparatus having a rib-shaped grid.
Figure 7:
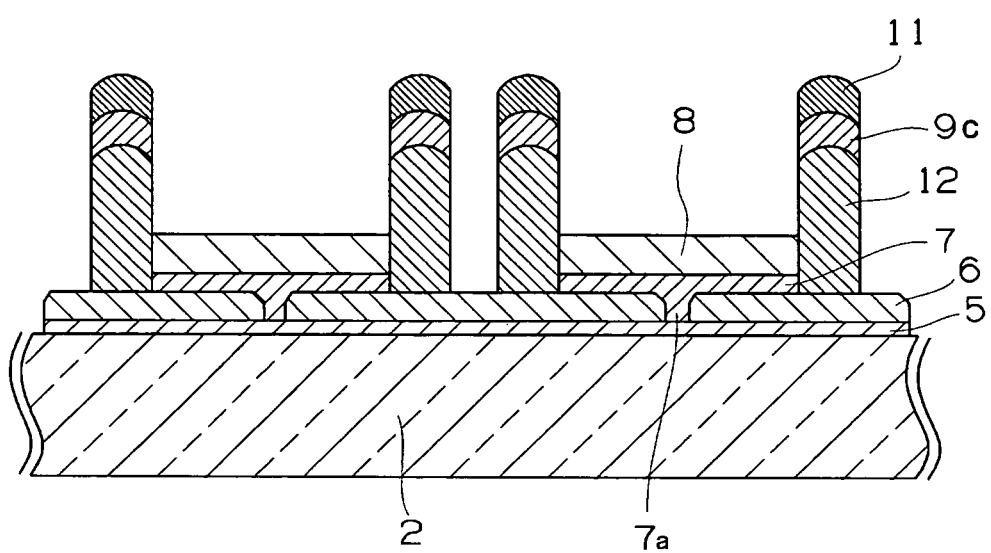
FIG. 7 is a cross-section view along line B-B in FIG. 6.

Another vacuum fluorescent display apparatus according to the present invention will now be described with reference to the drawings. FIG. 6 is a perspective view of a vacuum fluorescent display apparatus having a rib-shaped grid erected around the phosphor, and FIG. 7 is a cross-section view along line B-B in FIG. 6. Components having the same function as those shown in FIGS. 1 and 2 are affixed with the same numerals.

In the another vacuum fluorescent display apparatus 1', four sides of a glass substrate 2 and of a face glass 3 are sealingly joined using a spacer member 4, and a long, flat, box-shaped, airtight vacuum container is configured. The material used and other properties regarding each of the components are the same as those used in the vacuum fluorescent display apparatus 1, as shown in FIG. 1.

On the glass substrate 2 in the vacuum container, a wiring layer 5 is formed; then an insulating layer 6 is formed over substantially the entire surface other than where through-holes 7a are present; and an anode 7, which is electrically connected through the through-holes 7a, is formed. The phosphor or phosphor coated with a metal oxide layer 8 adheres to the anode 7. A rib 12, which is formed so as to be higher than the surface of the phosphor or phosphor coated with a metal oxide layer 8, is provided around the anode 7 and the phosphor or phosphor coated with a metal oxide layer 8. A structural body 9c, which functions as a rib electrode, is formed on a top part of the rib. An electrically conductive or semi-conductive metal oxide 11 is adheringly formed on an upper part of the rib electrode.

A filament cathode 10 for releasing low-energy electrons is provided above the phosphor or phosphor coated with a metal oxide layer 8 in the vacuum container. A low-energy electron beam generated from the filament cathode 10 strikes the phosphor or phosphor coated with a metal oxide layer 8, and the phosphor emits light. In FIG. 6, 5a represents leads connecting from a wiring pad, and 10a represents filament anchors.

An example of an electrically conductive or semi-conductive metal oxide used in the present invention is a metal oxide that readily forms a compound with barium released from the filament cathode. An example of a metal that forms a metal oxide of such description is at least one type of metal selected from titanium, tungsten, molybdenum, tin, indium, niobium, and zinc. From amongst the oxides of metals listed above, an electrically conductive or semi-conductive metal oxide, which does not experience chargeup caused by electron beam bombardment, is preferable, and an oxide made from titanium is particularly preferable.

With regards to a method for forming the metal oxide onto a structural body, (a) a metal oxide powder, or (b) an organic metal compound or an inorganic compound that can form a metal oxide by thermal decomposition, is used as an ingredient material. The method may be one in which a material of such description is caused to adhere to a grid or a similar metal surface by dipping, spin coating, spraying, aerosol deposition, painting by brush, or another method; dried; and calcined. Dipping is particularly preferable, because a simple device is used and the metal oxide can be readily caused to adhere.

Organic metal compounds or inorganic compounds are suitable as the material for covering the surface of a structural body, since an organic metal compound can be readily formed into a solution or a paste, and an inorganic compound can be readily made into an aqueous solution. From among organic metal compounds, an alcoholate compound, in which hydrogen in a hydroxyl group of an alcohol is substituted with a metal, is preferable, because an alcoholate compound readily forms a solution, and the structural body can be immersed in the solution, dried, calcined, and a coating thereby formed on the surface in a uniform manner. The concentration of metal content in the solution can be adjusted, or the immersion, drying, and calcination can be repeated, to adjust the film thickness of the coating.

Also, sputtering, chemical vapor deposition, another deposition process, or a similar method for forming a thin film can be used to form the metal oxide film. Sputtering, chemical vapor deposition, other deposition processes, and similar methods are preferable methods for forming a thin film on a desired surface of the structural body at a predetermined thickness.

The film thickness of the metal oxide film is preferably 10 μm or less, although this depends on the method for forming the film. If the film thickness exceeds 10 μm, the adhesion strength of the oxide film and the initial brightness decrease.

The metal oxide film is electrically conductive or semiconductive in order to prevent chargeup caused by low-energy electron bombardment. The volume resistivity as an oxide on its own is preferably $1 \times 10$ Ω·cm or less.

The phosphor used in the present invention is a phosphor that is excited and caused to emit light by the low-energy electron beam used in the vacuum fluorescent display apparatus. The phosphor is also one that includes at least an oxygen atom in the chemical formula of a parent material forming the phosphor. Examples of a phosphor that includes an oxygen atom include a phosphor having a titanate as a parent material; an oxysulfide-based phosphor; or a zinc oxide-based phosphor. From among the phosphors listed above, examples of a preferred phosphor include a phosphor having a titanate as a parent material and an oxysulfide-based phosphor.

An example of a phosphor having a titanate as a parent material is a phosphor represented by $Ca_{(1-x)}Sr_xTiO_3$:Pr,M. Here, M is at least one element selected from Al, Ga, In, Mg, Zn, Li, Na, and K, and x is $0 \leq x \leq 1$. If $x=0$, $CaTiO_3$ is used, and if $x=1$, $SrTiO_3$ is used. Unless specifically indicated, $CaTiO_3$ and $SrTiO_3$ refer not only to those whose stoichiometric composition is such that the Ca/Ti ratio or the Si/Ti ratio is 1, but also to those whose composition is such that the ratio is slightly greater or slightly smaller than 1. For example, those in which the ratio is between 1.05 and 0.95 are also included.

Example of a preferred phosphor include CaTiO3:Pr,Zn, Li,SrTiO3:Pr,Al and similar phosphors.

An example of a oxysulfide-based phosphor is a phosphor represented by $Ln_2O_2S$:Re. Here, Ln is at least one element selected from La, Gd, Y, and Lu; and Re is Eu, Tb, or Sm.

For a phosphor including at least an oxygen atom in the chemical formula of the parent material, a plurality of oxide layers are preferably sequentially laminated and caused to adhere to the surface of the main phosphor body.

One of the oxide layers is a layer of an oxide of at least one element selected from Gd, Pr, Y, Zn, Ta, and Sr (MO1); another is a layer of an oxide of at least one element selected from Si, Al, Mo, Sb, and Ce (MO2); and another is a layer of an oxide of at least one element selected from Ti, W, and Zr (MO3).

The layer of oxide (MO1) is a brightness-enhancing layer, and enhances the initial brightness of the main phosphor body. In particular, an oxide of Gd, Pr, Y, Zn, Ta, or Sr is capable of enhancing the initial brightness of a phosphor represented by $Ca_{(1-x)}Sr_xTiO_3$:Pr,M.

In particular, it was found that when $CaTiO_3$ is used as the titanate that forms the parent material, the effect of enhancing the initial brightness is greater, and the effect of the brightness-enhancing layer made from an oxide of Gd or Y is greater.

Although it is not clear why the initial brightness is enhanced, it is thought that the brightness-enhancing layer enhances the initial brightness because quantum resonance is generated between the adhered element and Pr, which is a center of light emission of the phosphor, energy is transmitted, and an enhancing effect is generated.

EXAMPLES

Example 1

A description will be given for an example in which an oxide that readily forms a compound with barium is provided on a surface of a mesh-shaped grid electrode (hereafter referred to as a "mesh").

Using an organic metal compound made from titanium (Fuji Kagaku Corporation; Hautform RD-Ti), a solution that has been diluted with ethanol so that the titanium oxide concentration is equal to 2 weight percent is prepared in a beaker or a similar glass container. Other than ethanol, the solution can also be diluted with isopropyl alcohol, terpineol, or another organic solvent.

A mesh, made from alloy 426, to be used for the grid electrode is immersed in the prepared solution. The immersed mesh is extracted, and excess solution remaining on the surface is blown off using a blower so that the mesh is coated by the solution in a uniform manner. The mesh is then dried, thereby causing an organic metal compound made from titanium to adhere to the mesh.

The mesh, having the organic metal compound made from titanium adhered thereto, is then mounted in the vacuum fluorescent display apparatus using a known method. Heat treatment, applied during a manufacturing procedure, causes the organic metal compound adhering to the mesh changes into titanium oxide. Titanium oxide is thereby formed on the surface of the mesh, which functions as a grid electrode.

Meanwhile, a wiring layer is formed from aluminium thin film on the glass substrate, and an insulating layer, whose primary component is glass, is formed thereon. Through-holes are provided on the insulating layer, providing a path through which electricity conducts between an anode, which is formed on the insulating layer and whose primary component is carbon, and the wiring layer.

Next, $CaTiO_3$:Pr,Zn,Li that has been subjected to coating treatment (hereafter referred to as Coated CTO) is formed on the anode as a red phosphor that does not contain Cd. The mesh described above is installed above the phosphor layer with a space provided therebetween. Then, a filament cathode is installed above the mesh with a space provided therebetween, whereby the vacuum fluorescent display apparatus is produced. The mesh and phosphor are mounted in the vacuum fluorescent display apparatus using a known method for producing a vacuum fluorescent display apparatus.

Coated CTO is made by causing 400 ppm of gadolinium oxide, which has a brightness-enhancing effect, to adhere as a first adhering layer, and 400 ppm of silicon oxide, which has a protective effect, to adhere as a second adhering layer, onto a $CaTiO_3$:Pr,Zn,Li main phosphor body. An organic tungsten compound that changes into tungsten oxide under heat treatment is then caused to adhere to the resulting phosphor. The adhered organic tungsten compound is changed into tungsten oxide by heat treatment at 400 to 600° C., and a third adhering layer (i.e., a protective layer) is obtained. The amount of tungsten oxide caused to adhere to the phosphor is 1000 ppm in relation to the main phosphor body.

The vacuum fluorescent display apparatus that is obtained is driven under an anode voltage of 50 V and a duty cycle of 1/60, and the brightness and lifespan characteristics of the phosphor are evaluated. Table 1 shows the evaluation results. In Table 1, the relative initial brightness represents the initial brightness relative to the initial brightness of a comparative example 1 described further below, and the brightness survival rate represents the brightness survival rate after 1000 hours when the initial brightness of each of the phosphors is 100%.

Examples 2 through 5

A vacuum fluorescent display apparatus is produced using the same method as that used in the example 1, except that the following organic metal compounds are used on the mesh surface, and subjected to the same evaluation as that for the example 1. The results are shown in Table 1.

Example 2: An organic metal compound made from zinc (Fuji Kagaku Corporation; Hautform RD-Zn)

Example 3: An organic metal compound made from tungsten (Fuji Kagaku Corporation; Hautform RD-W)

Example 4: An organic metal compound made from tin (Fuji Kagaku Corporation; Hautform RD-Sn)

Example 5: An organic metal compound made from molybdenum (Fuji Kagaku Corporation; Hautform RD-Mo)

Comparative Example 1

A comparative example 1 is a vacuum fluorescent display apparatus produced using the same method as that used in the example 1, except that no oxide is formed on the mesh surface. Results of the same evaluation as that for the example 1 are shown in Table 1.

Comparative Example 2

A comparative example 2 is a vacuum fluorescent display apparatus produced using the same method as that used in the example 1, except that no oxide is formed on the mesh surface, and CaTiO$_3$:Pr,Zn,Li that has not been subjected to coating treatment (hereafter referred to as "CTO") is used as the red phosphor. Results of the same evaluation as that for the example 1 are shown in Table 1.

Comparative Examples 3 and 4

A vacuum fluorescent display apparatus is produced using the same method as that used in the example 1, except that the following organic metal compounds are used on the mesh surface. The same evaluation as that for the example 1 is performed. The results are shown in Table 1.

Comparative Example 3: An organic metal compound made from aluminum (Fuji Kagaku Corporation; Hautform RD-Al)

Comparative Example 4: An organic metal compound made from silicon (Fuji Kagaku Corporation; Hautform RD-Si)

TABLE 1

| | Phosphor | Metal oxide | Relative initial Brightness | Brightness survival rate |
|---|---|---|---|---|
| Comparative example 1 | Coated CTO | — | 100% | 62% |
| Comparative example 2 | CTO | — | 96% | 50% |
| Example 1 | Coated CTO | Titanium oxide | 99% | 76% |
| Example 2 | Coated CTO | Zinc oxide | 101% | 59% |
| Example 3 | Coated CTO | Tungsten oxide | 97% | 64% |
| Example 4 | Coated CTO | Tin oxide | 95% | 65% |
| Example 5 | Coated CTO | Molybdenum oxide | 89% | — |
| Comparative example 3 | Coated CTO | Aluminum oxide | 78% chargeup | — |
| Comparative example 4 | Coated CTO | Silicon oxide | 81% chargeup | — |

As shown in Table 1, when an electrically conductive/semi-conductive metal oxide of titanium, tungsten, zinc, or tin is used for coating, an initial brightness and brightness survival rate substantially equivalent to those for the comparative example 1 is obtained. In particular, when titanium oxide is used for coating, even though the initial brightness is similar, the brightness survival rate after 1000 hours is approximately 14% higher than in the comparative example 1, representing an increase in lifespan characteristics.

Figure 8:
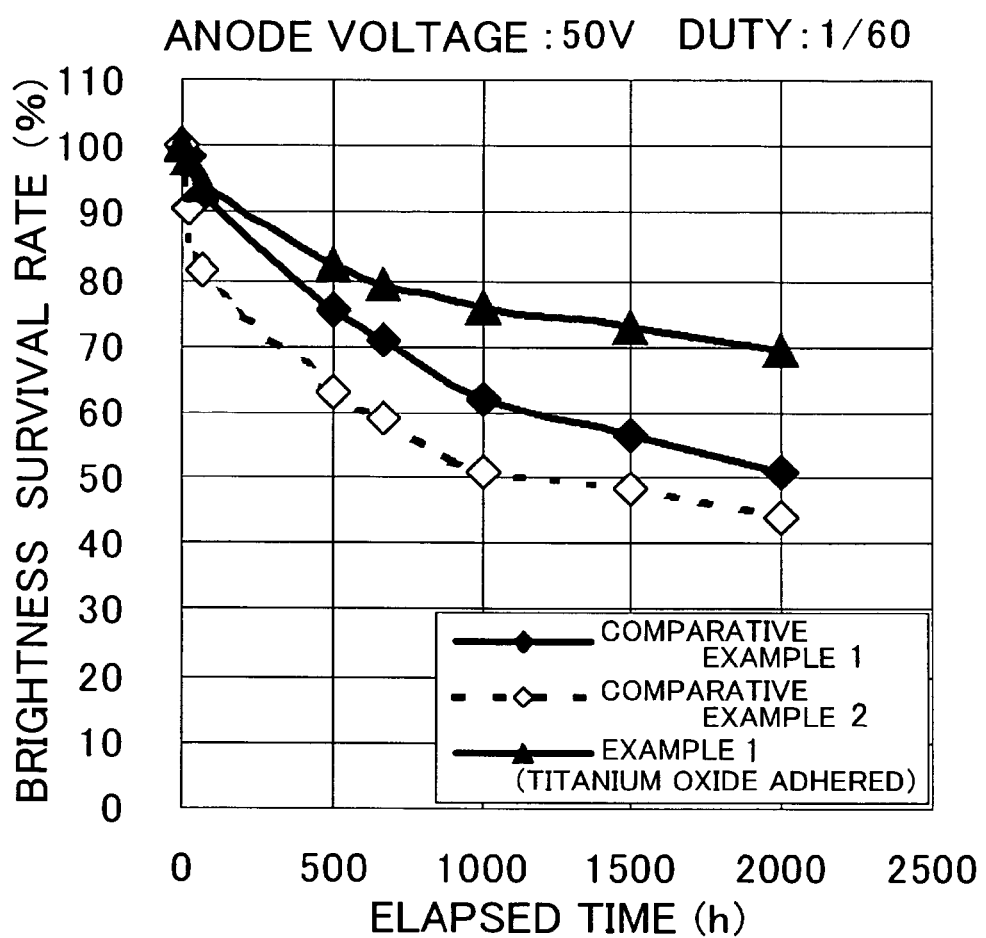
FIG. 8 is a drawing showing lifespan characteristics according to an example 1.

FIG. 8 is a drawing showing the time change in brightness survival rate of the comparative examples 1 and 2 and the example 1, where 100% represents the initial brightness; and shows a comparison of lifespan characteristics up to 2000 hours. While the brightness halves in 1000 hours in the comparative example 2 and in 2000 hours in the comparative example 1, the example 1 exhibits a brightness survival rate of approximately 70% even after 2000 hours.

Chargeup occurred in the comparative examples 3 and 4 since the oxides have an insulating property.

From the above, it can be seen that the oxide caused to adhere to the mesh is preferably electrically conductive or semi-conductive in order to prevent chargeup. Also, an oxide in which electrons and holes generated when the oxide adhering to the mesh is bombarded with an electron beam do not readily recombine results in a higher reactivity with respect to barium, and is therefore preferable. In particular, an oxide made from titanium is preferably adhered to the mesh.

Example 6

A vacuum fluorescent display apparatus is produced using the same method as that used in the example 1, except that an oxide made from titanium is formed by sputtering on the grid. The same evaluation as that for the example 1 is performed.

Sputtering is performed by high-frequency sputtering using a titanium oxide target (Furuuchi Chemical Corp.). Sputtering is performed by draining the chamber of air, then introducing Ar gas and applying an RF power (with a frequency of 13.56 MHz) at 150 W.

As a result of performing the same evaluation as that for the example 1, it was found that adheringly forming titanium oxide by sputtering results in an effect similar to the example 1 in which titanium oxide is adheringly formed by dipping.

Example 7

A description will now be given for examples in which a phosphor other than Coated CTO is used.

A vacuum fluorescent display apparatus is produced using the same method as that used in the example 1, except that $SrTiO_3$:Pr,Al is used as the red phosphor, and subjected to the same evaluation as that for the example 1. The results are shown in Table 2.

Comparative Example 5

A vacuum fluorescent display apparatus is produced using the same method as that used in the example 7, except that a regular mesh is used with no titanium oxide adhering thereto, and subjected to the same evaluation as that for the example 1. The results are shown in Table 2.

Example 8

A vacuum fluorescent display apparatus is produced using the same method as that used in the example 1, except that $(Ca_{0.8}Sr_{0.2})TiO_3$:Pr,Zn,Li is used as the red phosphor, and subjected to the same evaluation as that for the example 1. The results are shown in Table 2.

Comparative Example 6

A vacuum fluorescent display apparatus is produced using the same method as that used in the example 8, except that a regular mesh is used with no titanium oxide adhering thereto, and subjected to the same evaluation as that for the example 1. The results are shown in Table 2.

Example 9

A vacuum fluorescent display apparatus is produced using the same method as that used in the example 1, except that $Gd_2O_2S$:Eu is used as an orange phosphor, and subjected to the same evaluation as that for the example 1. The results are shown in Table 2.

Comparative Example 7

A vacuum fluorescent display apparatus is produced using the same method as that used in the example 9, except that a regular mesh is used with no titanium oxide adhering thereto, and subjected to the same evaluation as that for the example 1. The results are shown in Table 2.

Example 10

A vacuum fluorescent display apparatus is produced using the same method as that used in the example 1, except that ZnO:Zn is used as a blue/green phosphor, and subjected to the same evaluation as that for the example 1. The results are shown in Table 2.

Comparative Example 8

A vacuum fluorescent display apparatus is produced using the same method as that used in the example 10, except that a regular mesh is used with no titanium oxide adhering thereto, and subjected to the same evaluation as that for the example 1. The results are shown in Table 2.

TABLE 2

| Phosphor | Color of emitted light | Comparative example/Example | Mesh coating process | Relative initial Brightness | Brightness survival rate |
|---|---|---|---|---|---|
| $SrTiO_3$: Pr, Al | Red | Comparative example 5 | None | 100% | 14% |
| | | Example 7 | Titanium oxide adhered | 99% | 42% |
| $(Ca_{0.8}Sr_{0.2})TiO_3$: Pr, Zn, Li | Red | Comparative example 6 | None | 100% | 46% |
| | | Example 8 | Titanium oxide adhered | 98% | 55% |
| $Gd_2O_2S$: Eu | Orange | Comparative example 7 | None | 100% | 53% |
| | | Example 9 | Titanium oxide adhered | 95% | 73% |
| ZnO: Zn | Blue/green | Comparative example 8 | None | 100% | 79% |
| | | Example 10 | Titanium oxide adhered | 98% | 83% |

As shown in Table 2, regarding orange or red phosphors other than CTO, using a mesh having titanium oxide adhered thereto results again in an increase in brightness survival rate after 1000 hours, even though there are no significant changes in the initial brightness.

Figure 9:
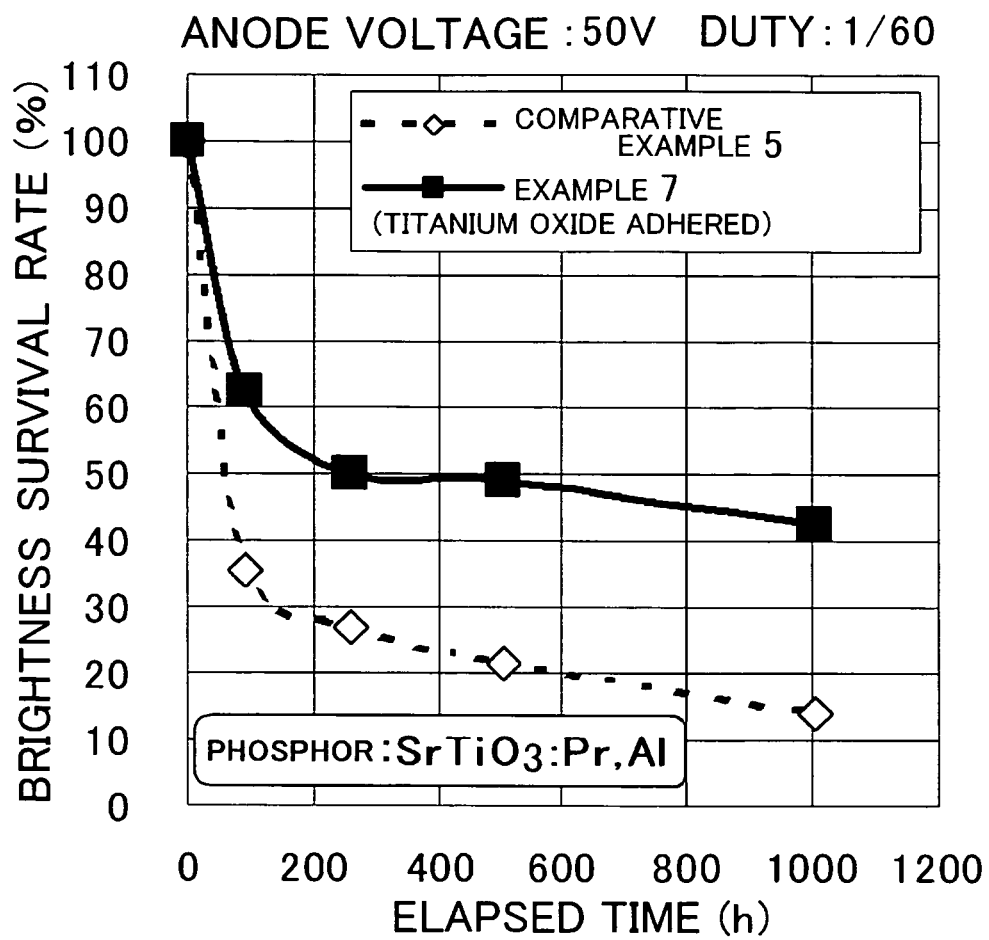
FIG. 9 is a drawing showing lifespan characteristics according to an example 7.

FIG. 9 shows the time change in brightness survival rate when the initial brightness is 100% for the comparative example 5 and the example 7.

Figure 10:
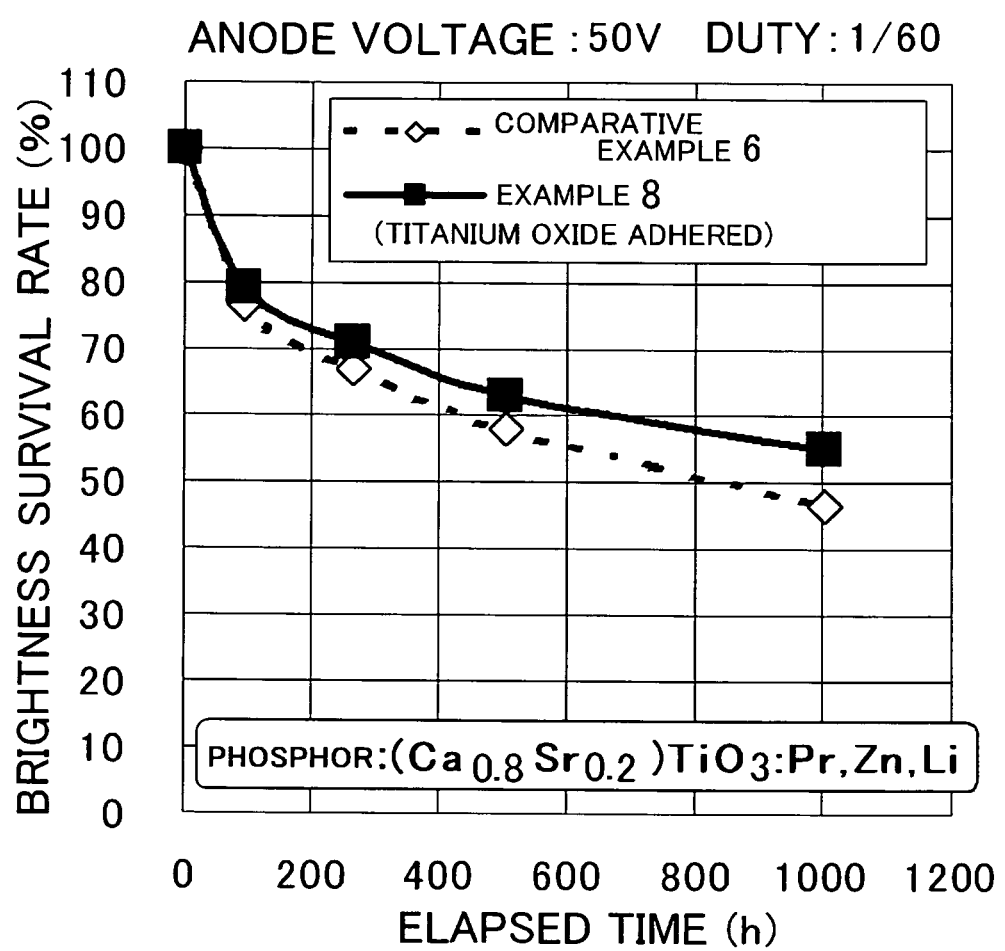
FIG. 10 is a drawing showing lifespan characteristics according to an example 8.

FIG. 10 shows the time change in brightness survival rate when the initial brightness is 100% for the comparative example 6 and the example 8.

Figure 11:
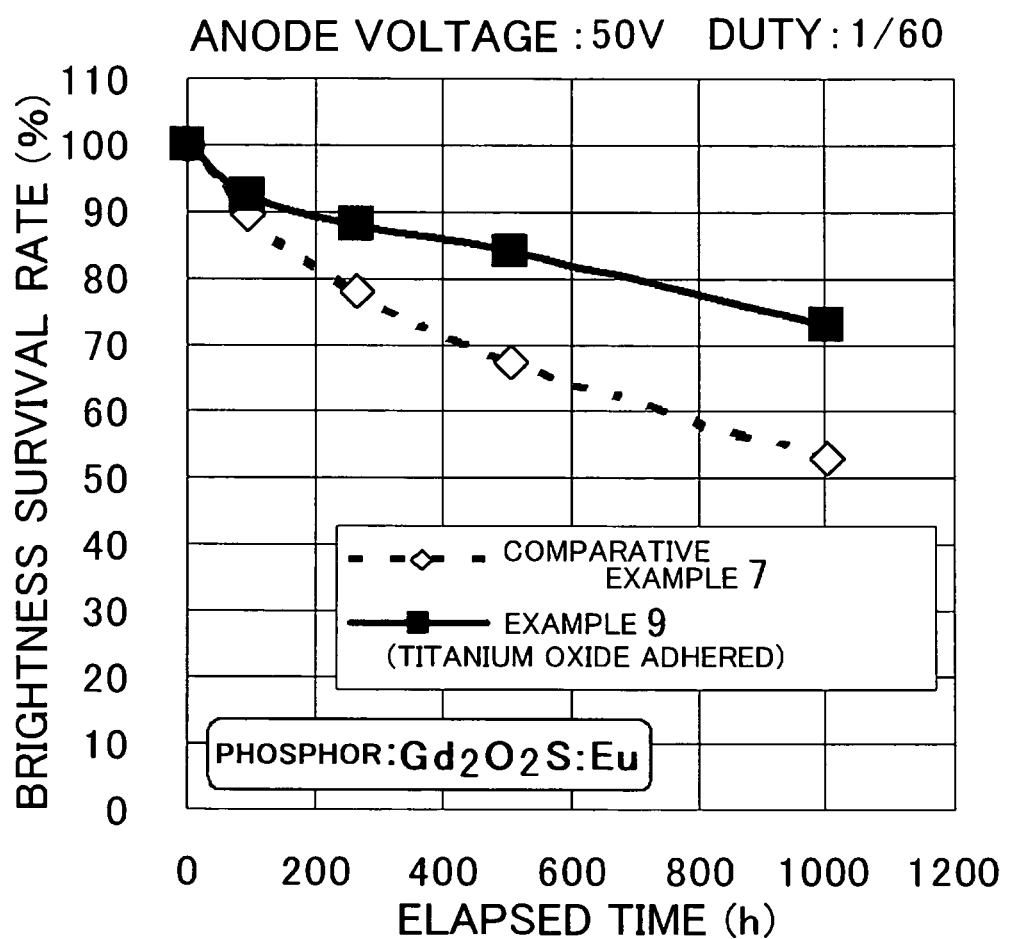
FIG. 11 is a drawing showing lifespan characteristics according to an example 9.

FIG. 11 shows the time change in brightness survival rate when the initial brightness is 100% for the comparative example 7 and the example 9.

Figure 12:
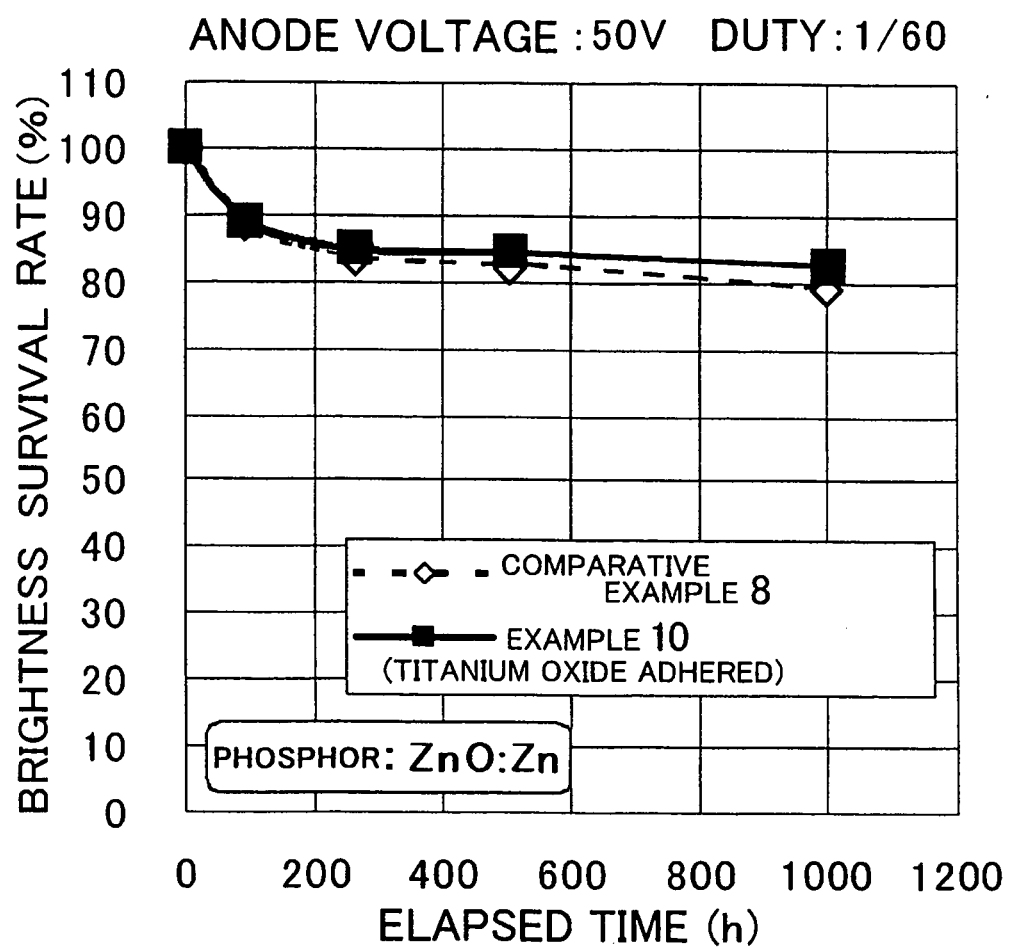
FIG. 12 is a drawing showing lifespan characteristics according to an example 10.

FIG. 12 shows the time change in brightness survival rate when the initial brightness is 100% for the comparative example 8 and the example 10.

In relation to ZnO:Zn, which inherently has a longer lifespan than red phosphors, using a mesh having titanium oxide adhered thereto results in lifespan characteristics that are similar to an instance in which no titanium oxide is used. However, in orange and red phosphors, using a mesh having titanium oxide adhering thereto inhibits the decrease in brightness survival rate and increases the lifespan, compared to an instance in which no titanium oxide adheres thereto. As a result, conventionally, lifespan characteristics differ between red phosphors and green phosphors, and in an instance in which, e.g., a mixture of colors is used, the difference in brightness increases over extended use, adversely affecting the display quality. However, in the vacuum fluorescent display apparatus according to the present invention, the lifespan of the red phosphor increases, and as a result, any decrease in display quality over extended use is minimized.

The following examples 11 through 13 are examples in which a structural body, to which an electrically conductive or semi-conductive metal oxide is formed on a surface, is provided to a location other than on the mesh; and a voltage is applied on the structural body, whereby low-energy electrons are controlled.

Example 11

A wiring layer is formed from aluminum thin film on a glass substrate, and an insulating layer whose main component is glass is formed thereon. Through-holes are formed on the insulating layer, providing a path through which electricity conducts between an anode, which is formed on the insulating layer and whose primary component is carbon, and the wiring layer. A phosphor layer made from Coated CTO is formed on the anode. Also, a rib is formed around the phosphor, and a rib electrode is formed on the rib. Also, an oxide made from titanium is formed on an upper part of the rib electrode, whereby a vacuum fluorescent display apparatus having a rib electrode is produced. The oxide made from titanium is formed using a printing method. Performing an evaluation similar to that for the example 1 resulted in an effect similar to that for the example 1.

Example 12

A vacuum fluorescent display apparatus was produced, the vacuum fluorescent display apparatus having a similar structure as the example 1 except that a mesh-shaped structural body to which an oxide of titanium has been caused to adhere is provided between the mesh and the filament cathode. The cross-section of the vacuum fluorescent display apparatus has the structure shown in FIG. 5. The structural body is made from alloy 426, and the oxide is formed on all surfaces of the structural body. No titanium oxide is formed on the grid surface. Performing an evaluation similar to that for the example 1 resulted in an effect similar to that for the example 1.

Example 13

A vacuum fluorescent display apparatus is produced in a similar manner to the example 12, except that the mesh-shaped structural body is replaced by a filament-shaped structural body. The cross-section of the vacuum fluorescent display apparatus has a structure shown in FIG. 6. No titanium oxide is formed on the grid surface. Performing an evaluation similar to that for the example 1 resulted in an effect similar to that for the example 1.

In an instance in which the structural body is provided other than the main grid electrode body, at least a potential at which emission of electrons is sustained must be applied, and a potential equal to or greater than the filament cathode voltage must be applied. Therefore, the relationship between potentials when the device is being driven is such that {filament cathode voltage<electrode voltage≤grid voltage}. If the voltage is higher than the grid electrode, the display quality will decrease. If the voltage is equal to or less than the filament cathode voltage, no electron beams are emitted; therefore, titanium oxide is not activated and the lifespan characteristics of the phosphor are not enhanced.

The following comparative example 9 and the example 14 are examples in which a comparison is made between an instance in which titanium oxide is provided to a region that is not bombarded by electron beams, and an instance in which titanium oxide is provided to a region that is bombarded by electron beams.

Comparative Example 9

Figure 13:
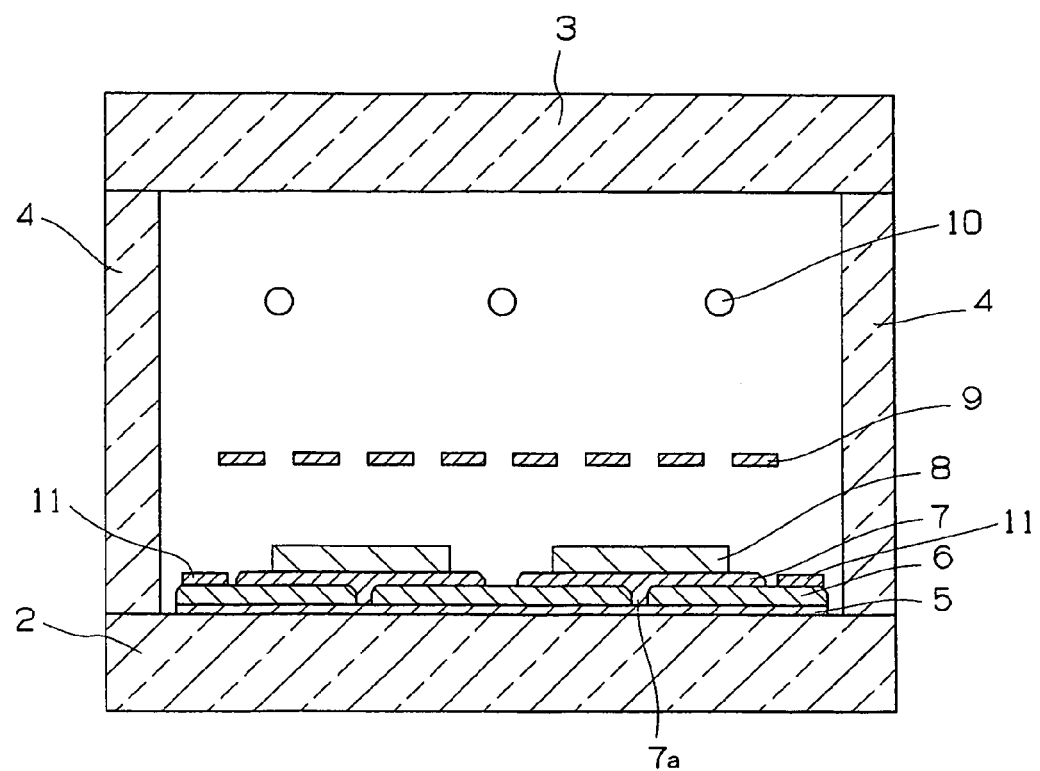
FIG. 13 is a drawing showing an example of an arrangement of the structural body according to a comparative example 9.

An example of arrangement of the structural body is shown in FIG. 13. A wiring layer 5 is formed from aluminum thin film on a glass substrate 2, and an insulating layer 6 whose main component is glass is formed thereon. Through-holes 7a are formed on the insulating layer 6, providing a path through which electricity conducts between an anode 7, which is formed on the insulating layer and whose primary component is carbon, and the wiring layer 5. A phosphor layer 8 made from CTO is formed on the anode 7. An oxide 11 made from titanium is formed, using a printing method, at a location on the insulating layer 6 on which the anode 7 is not formed. At this location, since the through-holes 7a and the anode 7 are not formed, no voltage is applied, and the location represents a region that is, as a rule, not bombarded with electron beams. Although there are instances in which the region is temporarily bombarded with electron beams, a chargeup occurs in such an instance. Therefore, the titanium oxide is not bombarded with electron beams in a continuous manner. Also, low-energy electrons released from the filament cathode 10 cannot be controlled.

A mesh made from alloy 426 to be used as the grid electrode 9 is arranged above the phosphor layer 8, and a filament cathode 10 is installed above the mesh with a space provided therebetween, whereby a vacuum fluorescent display apparatus is produced. The mesh and phosphor are mounted in the vacuum fluorescent display apparatus using a known method for producing a vacuum fluorescent display apparatus. Results of the same evaluation as that for the example 1 are shown in Table 3.

Example 14

A vacuum fluorescent display apparatus is produced using the same method as that for the comparative example 2, except that a mesh made from alloy 426 having titanium oxide formed on a surface, as used in the example 1, is used; and subjected to the same evaluation as that for the example 1. The results are shown in Table 3. The results for the comparative example 2 are also shown. In Table 3, the relative initial brightness represents the initial brightness relative to the initial brightness of a comparative example 2, and the brightness survival rate represents the brightness survival rate after 1000 hours when the initial brightness of each of the phosphors is 100%.

TABLE 3

| | Phosphor | Metal oxide | Relative initial Brightness | Brightness survival rate |
|---|---|---|---|---|
| Comparative example 2 | CTO | — | 100% | 50% |
| Comparative example 9 | CTO | Titanium oxide at location not bombarded with electron beams | 101% | 49% |
| Example 14 | CTO | Titanium oxide at location bombarded with electron beams | 98% | 58% |

As shown in Table 3, the brightness survival rate for the example 14 is 58%. In contrast, the brightness survival rate for the comparative example 2, in which no titanium oxide is provided on the mesh, is 50%; and the brightness survival rate for the comparative example 9, in which titanium oxide is provided in a region that is not bombarded with electron beams, is 49%. It can be seen that bombarding titanium oxide with electron beams increases the brightness survival rate.

The vacuum fluorescent display apparatus according to the present invention is capable of extending the lifespan of red phosphors, therefore making it possible to minimize any decrease in the display quality even when used over an extended period of time as a mixture of colors in combination with a phosphor of another color. Accordingly, the vacuum fluorescent display apparatus according to the present invention can be applied to a vacuum fluorescent display apparatus that does not contain Cd.

The invention claimed is:

1. A vacuum fluorescent display apparatus comprising a filament cathode and an anode;
the filament cathode having a BaO, and being arranged in a vacuum container, and used for releasing low-energy electrons;
the anode having a phosphor adhered thereto, and being struck by the low-energy electrons and thereby caused to emit light;
the vacuum fluorescent display apparatus characterized in having:
a structural body configured from a metallic material, and provided to a region in which the low-energy electrons released from the cathode can be controlled and the region is bombarded by the low-energy electrons;
the structural body having an electrically conductive or semi-conductive metal oxide formed on a surface of the metallic material at a portion that is bombarded by the low-energy electrons;
the metal oxide being a metal oxide that readily forms a compound with barium released from the filament cathode.

2. The vacuum fluorescent display apparatus according to claim 1, characterized in that the structural body is a metal mesh-shaped grid.

3. The vacuum fluorescent display apparatus according to claim 1, characterized in that the structural body is a rib-shaped grid erected around the phosphor.

4. The vacuum fluorescent display apparatus according to claim 1, characterized in that the structural body is provided between the filament cathode and the anode.

5. The vacuum fluorescent display apparatus according to claim 1, characterized in that the electrically conductive or semi-conductive metal oxide is an oxide of titanium.

6. The vacuum fluorescent display apparatus according to claim 1, characterized in that the phosphor is one that includes at least an oxygen atom in a chemical formula of a parent material.

7. The vacuum fluorescent display apparatus according to claim 6, characterized in that the phosphor is a phosphor having a titanate as a parent material, or an oxysulfide-based phosphor.

8. The vacuum fluorescent display apparatus according to claim 7, characterized in that the phosphor having a titanate as a parent material is a phosphor represented by $Ca_{(1-x)}Sr_xTiO_3$:Pr, M; where M is at least one element selected from Al, Ga, In, Mg, Zn, Li, Na, and K; and x is within a range of $0 \leq x \leq 1$.

9. The vacuum fluorescent display apparatus according to claim 8, characterized in that the phosphor having a titanate as a parent material has a metal oxide layer formed on a surface.

10. The vacuum fluorescent display apparatus according to claim 7, characterized in that the oxysulfide-based phosphor is a phosphor represented by $Ln_2O_2S$:Re; where Ln is at least one element selected from La, Gd, Y, and Lu; and Re is Eu, Tb, or Sm.

* * * * *